Dec. 2, 1958 M. E. WOOD 2,862,343
ROTARY DISC TYPE MOWER ATTACHMENT FOR TRACTORS
Filed Jan. 19, 1955 2 Sheets-Sheet 1
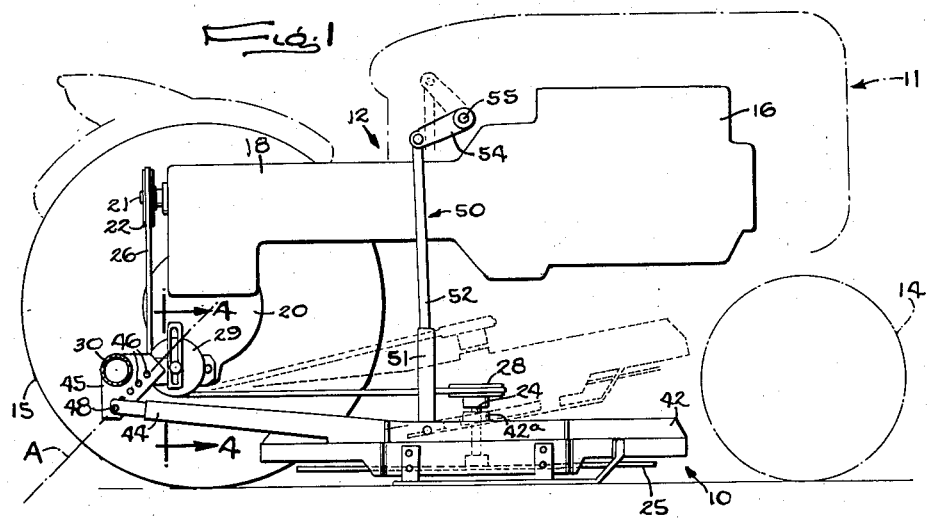
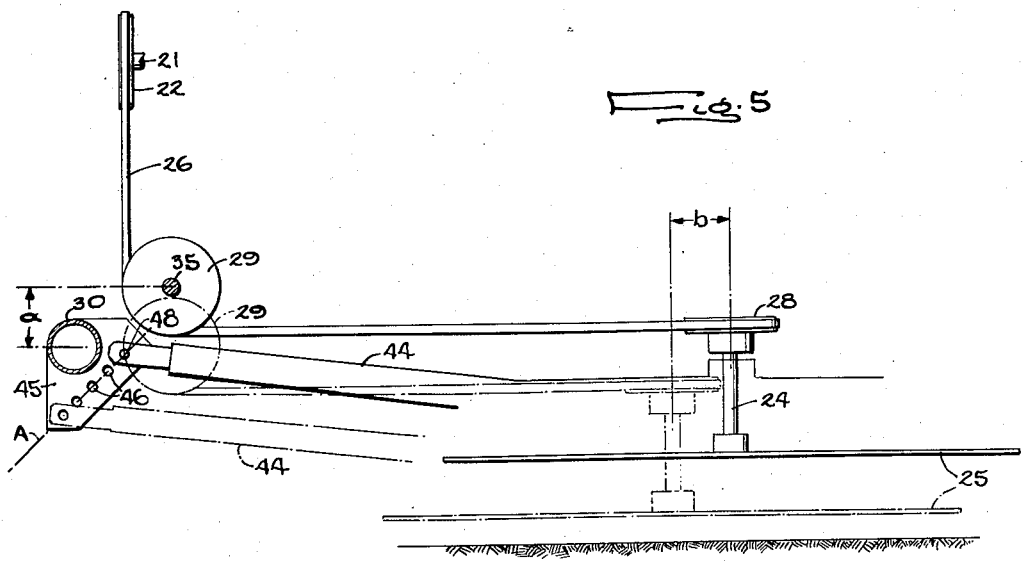
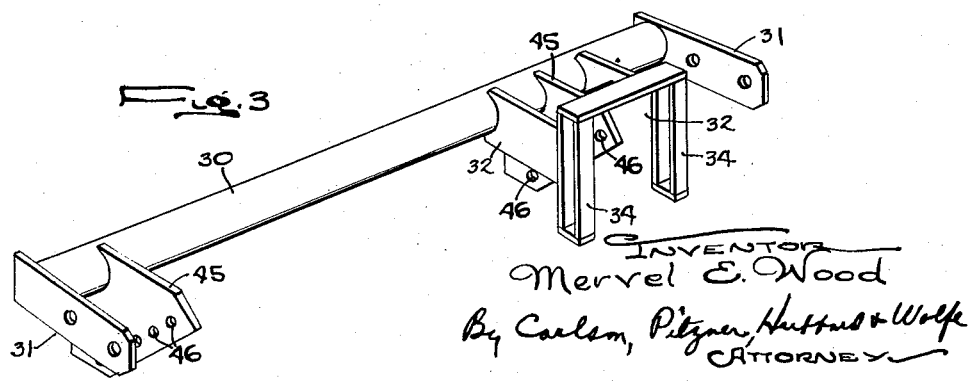
INVENTOR
Mervel E. Wood
By Carlson, Pitzner, Hubbard & Wolfe
ATTORNEYS

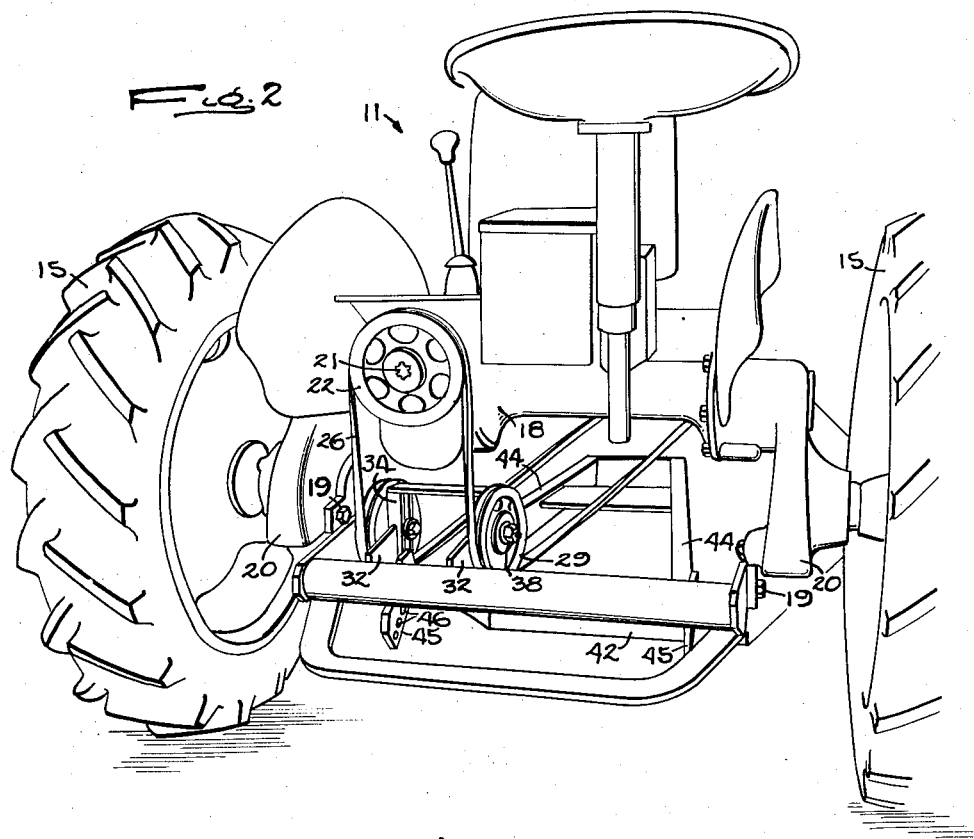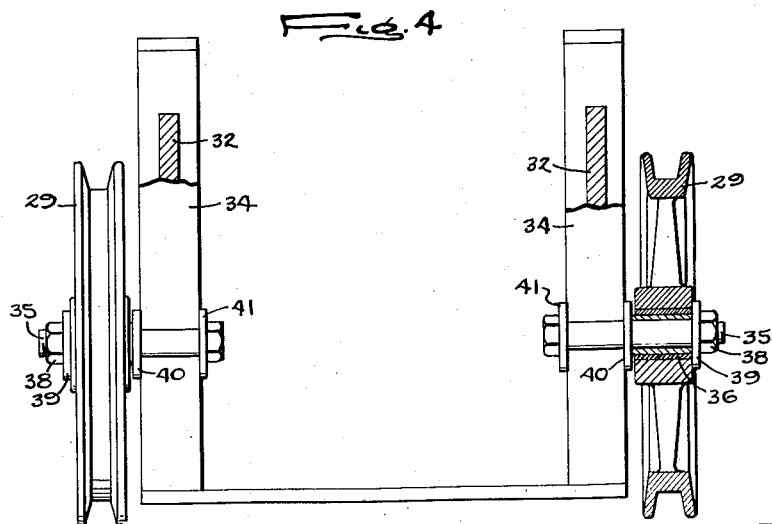

United States Patent Office 2,862,343
Patented Dec. 2, 1958

2,862,343

ROTARY DISC TYPE MOWER ATTACHMENT FOR TRACTORS

Mervel E. Wood, Oregon, Ill., assignor to Wood Brothers Manufacturing Co., Oregon, Ill., a corporation of Illinois Application January 19, 1955, Serial No. 482,810

7 Claims. (Cl. 56—25.4)

The present invention relates in general to implements for use on tractors and in particular to implements, such as horizontal rotary cutters, adapted to be powered from the tractor engine.

The general aim of the invention is to provide a tractor attachment, such as a rotary cutter, having a vertical shaft driven from the tractor's horizontal power take-off shaft and mounted in a novel manner to facilitate vertical adjustments of the attachment operating component.

Another object of the invention is to provide such an attachment in which the operating component, such as the blade in a horizontal rotary cutter, is maintained in the same orientation, e. g., parallel to the ground, as it is adjusted to various vertical positions.

It is a further important object to provide such an attachment in which the distance spanned by a flexible driving element connecting the tractor power take-off shaft and the vertical shaft is maintained constant as vertical adjustments of the operating component are made, thereby requiring but a single flexible element which is always in proper tension.

Still another object is to provide such an arrangement in which the flexible driving element or belt is maintained at right angles to a horizontally disposed power take-off shaft and a vertically disposed attachment shaft, so that the element runs smoothly over sheaves or the like on the two shafts with no tendency to slip free.

A further object is the provision of such an attachment for tractors which is simple and economical in construction, and conveniently adjusted to various vertical operating positions.

Other objects and advantages will become apparent as the following description proceeds, taken in conjunction with the accompanying drawings, in which:

Figure 1 is a side elevation of an implement or attachment embodying the features of the invention and shown as employed on a typical tractor (illustrated in outline);

Fig. 2 is an enlarged rear perspective view of the attachment and tractor shown in Fig. 1;

Fig. 3 is a detail view, in perspective, of a mounting cross bar for the attachment;

Fig. 4 is a detail view, in section taken substantially along the line 4—4 in Fig. 1 illustrating the mounting of idler sheaves for vertical adjustment; and Fig. 5 is a diagrammatic view showing the attachment adjusted to various vertical operating positions.

Although the invention has been shown and described in some detail with reference to a particular embodiment thereof, there is no intention that it thus be limited to such detail. On the contrary, it is intended here to cover all modifications, alternative constructions and equivalents falling within the spirit and scope of the invention as defined by the appended claims.

Referring now to the drawings, the invention has been illustrated as embodied in an implement 10 cooperatively attached to a tractor 11 of the conventional agricultural type. While the latter may take any one of a variety of well known forms, it may be observed by way of setting the background or environment of the invention that the tractor includes the usual body 12 supported on steerable front wheels 14 and large rear traction wheels 15. The body has, as an integral part, an engine 16. Driving power from the engine 16 is transferred through an appropriate transmission 18 to the rear wheels 15. For the attachment of various trailed implements, the tractor is conventionally equipped with connecting components at its rear end, these comprising, in the present instance, a plurality of mounting bolts 19 carried by spaced axle housings 20. In order to utilize power from the engine 16 to drive auxiliary equipment, the usual power take-off shaft 21, driven from gearing within the transmission 18, extends horizontally and rearwardly from the latter. In this instance, the power take-off shaft 21 is equipped with a spline-covered sheave 22 which thus rotates in a vertical plane at the rear of the tractor.

The attachment or implement 10 is of the type which has an operating mechanism or component disposed beneath the central portion of the tractor 11, and a substantially vertical power input shaft 24 which is to be driven from the power take-off shaft 21. While the operating component or mechanism may take a variety of forms in different implements, it is here shown as a rotary cutter blade 25 fixed directly to the lower end of the shaft 24 and disposed in substantially parallel relation with the ground. The blade has sharpened edges and upon rotation effectively cuts grass, vines or other vegetation as the tractor advances. It may also be used to mulch leaves, cornstalks and other foliage on the ground.

For transferring rotational motion from the power take-off shaft 21 to the cutter shaft 24, an endless flexible drive element, preferably a rubber-like V-belt 26, is drivingly connected between the two. The belt runs over a driven sheave 28 mounted fast on the upper end of the cutter shaft 24, and the sheave 22 on the power take-off shaft 21, as well as around a pair of spaced idler pulleys 29 located beneath the power take-off sheave for rotation about a common axis running transversely of the tractor. This gives the belt 26 a smooth bend through substantially 90°.

The problem is posed in an attachment of the type described of adjusting the vertical operating position of the cutter blade 25 when it is employed under different conditions. For example, in mowing lawns or mulching leaves the blade should be located relatively close to the ground. By contrast, in cutting alfalfa or clover, the blade should be considerably spaced from the ground in order to promote regrowth of a second crop. Additionally, when operating over uneven terrain having scattered rocks and tree roots it is best that the blade be spaced relatively high so as to avoid damage to it.

Assuming that the shaft 24 is mounted on the tractor 11 so as to be vertically adjusted for the purposes described, three critical problems remain in effecting such adjustment. These are (1) maintaining the belt coplanar with the sheaves 22 and 28, i. e., at right angles to the respective shafts 21 and 24, so that it does not slip off; (2) maintaining the blade 25 substantially horizontal, i. e., parallel to the ground; and (3) maintaining a uniform length for the path of the belt 26 so that it is properly tensioned.

In accordance with the invention, all of these problems are solved by simple mounting components which enable quick adjustments. First, means are provided for adjusting the idler pulleys 29 vertically so that their lower edges are at the level of the sheave 28 as the shaft 24 is adjusted to different vertical positions. With the rear edges of the pulleys 29 vertically alined with the sheave 22, the belt is maintained at right angles to the shafts 21 and 24 so that there is no tendency for the belt to slip off of the sheaves. Secondly, the mounting means for connecting the implement to the tractor are constructed such that the shaft 24 and sheave 28 are adjusted horizontally in a direction fore and aft of the tractor as an incident to their adjustment to various vertical operating positions, thereby keeping the path of the belt 26 at a uniform length and maintaining proper tension in the latter.

As illustrated in the present instance, the idler pulleys 29 are supported at the rear underside of the tractor by a cross bar 30 which is adapted in any convenient manner for attachment to the tractor. Forwardly extending apertured straps 31 are fixed, as by welding, to the opposite ends of the cross bar 30, the straps being suitably spaced for receiving the mounting bolts 19 already existing on the axle housings 22 of the particular tractor illustrated. Fast on the cross bar 30 are a pair of forwardly extending arms 32 which support vertical guide brackets 34. As illustrated best in Fig. 4, each of the pulleys 29 is supported for vertical adjustment in one of the brackets 34 and for rotation about an axis transverse of the tractor by a cross bolt 35. A bearing sleeve 36 is telescoped over each bolt to journal the pulleys 29, and the bolt is locked at any vertical position in the guide bracket 34 by tightening a nut 38 which clamps the sleeve between washers 39 and 40 while clamping the bracket between the washer 40 and an end washer 41. It is but a simple matter, therefore, to loosen the nuts 38 and slide the bolts 35 up or down within the bracket 34 in order to set the pulleys 29 at any desired vertical position. Regardless of the vertical adjustment of the pulleys 29, their rear edges remain vertically alined with the power take-off sheave 22 as illustrated best in Figs. 1 and 5.

Supporting the cutter shaft 28 and the blade 25 fixed thereto centrally beneath the tractor 10 is a frame 42 provided with a bearing collar 42a which journals the shaft. The frame 42 may include, as desired, an appropriate protective housing for the blade 25, and it includes a pair of rigid arms 44 extending rearwardly to the location of the cross bar 30.

Means are provided to attach the rear ends of the arms 44 to the tractor optionally at any one of a plurality of locations disposed along a line inclined from the vertical in a direction fore and aft of the tractor. For this purpose, a pair of mounting plates 45 are rigidly fixed, as by welding, at spaced locations on the cross bar 30. Each of the plates has a series of holes 46 lying along a line A inclined 45° from the vertical in a direction toward the front of the tractor (see Fig. 1). The rear ends of the arms 44 are apertured to receive locking pins 48 passed through selected ones of the holes 46, thereby pivotally connecting the frame 42 to the plates for vertical rocking about the rear ends of the arms. It will be observed that as the arms are successively repositioned by inserting the pins 48 in lower and rearwardly spaced ones of the holes 46, the shaft 24, blade 25, and input sheave 28 are all shifted both rearwardly and downwardly, assuming that in each instance the frame 42 is rocked about the pin 48 until the blade is substantially horizontal.

Inasmuch as in the exemplary embodiment the aft ends of the arms 44 are pivotally connected to the plates 45, a vertically adjustable linkage 50 is connected between the tractor 11 and the frame 42 in order to level the blade 25 each time that the pivot connection to the plates 45 is changed. As here shown, the linkage comprises a bracket 51 fixed in upstanding relation to the frame 42 and connected by a rod 52 extending upwardly for pivotal attachment to a radius arm 54 fast on a rockshaft 55. The rockshaft may be controlled in its angular position by a suitable auxiliary hydraulic actuator (not shown) of the type commonly employed on many tractors. It will be understood, therefore, that the tractor operator may easily adjust the vertical position of the frame 42 until the blade 25 is substantially horizontal for any location of the pivot connection between the arms 44 and the plates 45. Moreover, as illustrated by dashed lines in Fig. 1, this vertically movable linkage 50 may be employed to swing the frame 42 to a high transport position so that it easily clears the ground as the tractor is driven from one working location to another.

With the implement attachment 10 constructed and mounted as described above, it is but a simple matter to change the vertical operating position of the blade 25 while at the same time maintaining the blade parallel with the ground, maintaining the belt 26 coplanar with the sheaves 22 and 28, as well as maintaining the length of the belt path constant so that it has proper driving tension. Assume, for example, as shown by solid lines in Fig. 5, that the blade 25 and blade shaft 24 are initially in a relatively high working position. They are easily repositioned to ride more closely to the ground. The operator need only remove the pins 48 to disconnect the arms 44 from the upper holes 46 in the plates 45. He then replaces the pins 48 in the lower one of the holes 46, inserting them through the apertured rear ends of the arms to complete the pivotal connection. Next, the rockshaft 55 and radius arm 54 are rotated slightly counterclockwise (Fig. 1) to lower the frame 42 until the blade 25 is again parallel with the ground as illustrated by dashed lines in Fig. 5. It will be observed that this causes the input sheave 28 to not only be lowered, but also to be shifted rearwardly through the distance $b$ (Fig. 5). As the next step, the operator loosens the nuts 38 for the pulley mounting bolts 35 and lowers the position of the idler pulleys 29 until their lower edges are at the level of the input sheave 28. This results in the idler pulleys being lowered through the distance $a$ (Fig. 5) thereby lengthening the vertical flight of the belt 26 by a distance equal to the shortening of the horizontal flight of the belt occasioned by the rearward shifting of the belt 28 through the distance $b$. Accordingly, the belt is thus maintained in right-angular relationship to the power take-off shaft 21 and adjusted to have a right-angular relationship with the cutter shaft 24. At the same time, the total length of the belt path is maintained constant by increasing the length of the vertical flight and decreasing the length of the horizontal flight by the equal distances $a$ and $b$. Proper tension in the single necessary belt 26 is thereby maintained. It will be apparent that vertical adjustments of the blade 25, frame 42, and cutter shaft 24 may be made in the same manner to various intermediate positions by changing the pivotal connection of the arms 44 to any one of the holes 46 in the plates 45.

While the invention has been illustrated in connection with a specific implement of the horizontal rotary blade type, it will be understood that it is equally advantageous with various other implements which employ a vertical input shaft, such as the shaft 24, disposed centrally beneath the tractor and powered from the tractor's power take-off shaft.

I claim:

1. For use with a tractor having a rearwardly extending power take-off shaft equipped with a driving sheave rotatable in a vertical plane, an implement attachment comprising, in combination, a cross bar attachable in transverse spanning relation across the rear of the tractor beneath said power take-off shaft, a pair of mounting plates rigidly fixed at spaced points on said cross bar and provided with a plurality of holes lying along a line inclined from the vertical toward the front end of the tractor, a pair of vertical guide brackets rigidly fixed to said cross bar, a frame journaling a vertical input shaft disposed centrally beneath the tractor and having rearwardly extending arms pivotally connected selectively at any one of the holes in corresponding ones of said plates, a driven sheave on the upper end of said vertical shaft, a pair of idler pulleys mounted for vertical adjustment in said guide brackets and to turn about an axis extending transversely of the tractor, said idler pulleys being located with their rear edges immediately beneath the driving sheave, and an endless flexible belt running over the driving sheave, said idler pulleys, and said driven sheave.

2. The combination set forth in claim 1 further characterized in that said line along which said holes lie is inclined 45° from the vertical.

3. For use with a tractor having a horizontal rearwardly extending power take-off shaft equipped with a driving sheave, an implement attachment comprising, in combination, a frame adapted to be disposed centrally beneath the tractor and journaling a vertically extending input shaft having a driven sheave at its upper end, said frame having a rearwardly extending arm, means attaching the rear end of said arm optionally at the rear of the tractor at any one of a plurality of locations disposed along a line inclined from a vertical toward the front end of the tractor, a pair of idler pulleys, means mounting said idler pulleys at the rear of the tractor for rotation about a transverse axis adjustable in height and with the rear edges of the pulleys disposed vertically beneath the sheave on the tractor's power take-off shaft, and an endless flexible drive element drivingly running over the driving sheave, the idler pulleys, and said driven sheave, said element being tensionable upon the connection of said arm at any one of said locations by vertically shifting said idler pulleys.

4. In an attachment for a tractor having a rear power take-off shaft, and in which a driven shaft is vertically disposed beneath the tractor intermediate the fore and aft ends of the latter, the combination of a frame journaling the upright shaft and having a rearwardly extending arm, means pivotally connecting the rear end of said arm to the rear underside of the tractor optionally at any of a plurality of locations disposed along a line inclined fore and aft of the tractor from the vertical, a linkage connectable between the tractor and said frame for adjustably rocking the latter until the shaft is vertical when the arm is connected at any of said locations, an endless flexible driving element drivingly connecting the power take-off shaft and the driven shaft, and vertically adjustable means disposed beneath the power take-off shaft for taking up slack in said element when the arm is moved from one of said locations to a location spaced rearwardly therefrom.

5. For use with a tractor having a rearwardly extending power take-off shaft equipped with a driving sheave, a mounting for holding a cutter blade beneath the tractor to rotate in a plane generally parallel to and adjustably spaced from the ground, said mounting comprising, in combination, a cutter shaft having a driven sheave at its upper end and supporting the blade at its lower end, a frame journaling said cutter shaft in a generally vertical position, an arm extending rearwardly of the tractor and rigidly fixed at its forward end to said frame, a plate adapted for mounting at the rear underside of the tractor and having a plurality of transverse holes in a line inclined downwardly and rearwardly of the tractor, means pivotally connecting the rear end of said arm optionally at any one of said holes, a linkage connected between the tractor and said frame for adjustably rocking the latter about the pivoted connection of said arm to said plate to position the blade parallel to the ground, a pair of idler sheaves, vertically adjustable means for journaling said idler sheaves in spaced relation for rotation about a transverse axis at the rear of the tractor, and an endless belt running over said driving, idler, and driven sheaves to rotate the blade, the belt being held in proper tension and maintained at right angles to said cutter shaft in any vertical position of the blade by vertical adjustment of said idler sheaves.

6. For use with a tractor having a rearwardly extending power take-off shaft, a mounting for a cutter blade disposed beneath the tractor and adapted to rotate in a plane parallel to and adjustably spaced from the ground, said mounting comprising, in combination, a shaft for supporting said blade, a frame for journaling said shaft in a generally upright position, an arm rigidly fixed at its forward end to said frame and extending rearwardly from the latter, means pivotally connecting the rear end of said arm to the rear underside of the tractor optionally at a plurality of points spaced along a line inclined from the vertical thereby changing the fore and aft as well as vertical location of the rear end of said arm, a linkage interposed between the tractor and said frame for adjustably rocking said arm about its rear end connection to bring said shaft to a horizontal position, an endless, flexible element drivingly connected between the power take-off shaft and the blade shaft, and means including idlers over which said element runs mounted for vertical adjustment beneath the power take-off shaft to tension said element and maintain it at right angles to the blade shaft for any vertical position of the latter.

7. For use on a tractor having a rearwardly extending power take-off shaft, a cutter attachment comprising, in combination, a frame journaling a generally vertical shaft having a substantially horizontal cutter blade fixed to its lower end, said frame being disposed centrally beneath the tractor and having a rigid arm extending rearwardly, means pivotally connecting the rear end of said arm for rocking the frame about a transverse axis at any one of a plurality of locations disposed along a line inclined from the vertical in a direction fore and aft of the tractor, a linkage to be connected between the tractor and said frame for adjustably rocking the latter to position said blade parallel to the ground, means including an endless belt drivingly connecting the power take-off shaft and the blade shaft, a pair of idler sheaves mounted beneath the power take-off shaft for rotation about a transverse axis to lead said belt from the power take-off shaft to the blade shaft, and means supporting said idler sheaves for vertical adjustment to maintain proper tension in said belt as the support is shifted vertically and fore and aft upon relocation of the connection of the rear ends of said arms.

References Cited in the file of this patent
UNITED STATES PATENTS

| | | |
|---|---|---|
| 799,826 | Brophy | Sept. 19, 1905 |
| 2,489,730 | Soenksen | Nov. 29, 1949 |
| 2,576,886 | McCoy | Nov. 27, 1951 |
| 2,578,963 | Bell | Dec. 18, 1951 |
| 2,651,246 | Peters et al. | Sept. 8, 1953 |
| 2,680,945 | Reed | June 15, 1954 |
| 2,711,624 | Crump | June 28, 1955 |